US009582515B1

(12) United States Patent
Doubleday et al.

(10) Patent No.: US 9,582,515 B1
(45) Date of Patent: Feb. 28, 2017

(54) DETECTING QUERIES FOR SPECIFIC PLACES

(71) Applicant: Google Inc., Mountain View, CA (US)

(72) Inventors: Alan G. Doubleday, Macquarie Park (AU); Jordan Bayliss-McCulloch, Beaconsfield (AU)

(73) Assignee: Google Inc., Mountain View, CA (US)

( * ) Notice: Subject to any disclaimer, the term of this patent is extended or adjusted under 35 U.S.C. 154(b) by 237 days.

(21) Appl. No.: 14/250,607

(22) Filed: Apr. 11, 2014

(51) Int. Cl.
*G06F 17/30* (2006.01)
(52) U.S. Cl.
CPC .............................. *G06F 17/30241* (2013.01)
(58) Field of Classification Search
CPC ...................... G06F 17/30041; G06F 17/30241
USPC ........................................................ 707/771
See application file for complete search history.

(56) References Cited

U.S. PATENT DOCUMENTS

| 7,257,570 | B2 | 8/2007 | Riise et al. |
| 7,424,472 | B2 | 9/2008 | Wang et al. |
| 7,743,048 | B2 | 6/2010 | Baldwin |
| 8,745,065 | B2 | 6/2014 | Wang |
| 8,782,030 | B1 | 7/2014 | Li et al. |
| 2008/0243783 | A1* | 10/2008 | Santi ................. G06F 17/30241 707/3 |
| 2008/0319990 | A1 | 12/2008 | Taranenko et al. |
| 2012/0072287 | A1* | 3/2012 | Crane ................ G06Q 30/0261 705/14.58 |
| 2012/0278339 | A1* | 11/2012 | Wang ................ G06F 17/30241 707/748 |
| 2013/0080149 | A1* | 3/2013 | McCombs ............ G06F 17/278 704/9 |
| 2014/0067860 | A1 | 3/2014 | Govindachetty et al. |

* cited by examiner

*Primary Examiner* — Amresh Singh
*Assistant Examiner* — Dawaune Conyers
(74) *Attorney, Agent, or Firm* — Fish & Richardson P.C.

(57) ABSTRACT

The subject matter of this specification can be embodied in, among other things, a method that includes identifying a search query that was submitted through a map interface, determining that a number of specific query indicators that are included in the search query meets a pre-specified number of specific query indicators, wherein the specific query indicators are selected, at least in part, from a set consisting of commas and capital letters, classifying, in response to the determination, the search query as a specific place query, and providing, based on the determination, content that excludes sponsored content in response to the search query.

14 Claims, 5 Drawing Sheets

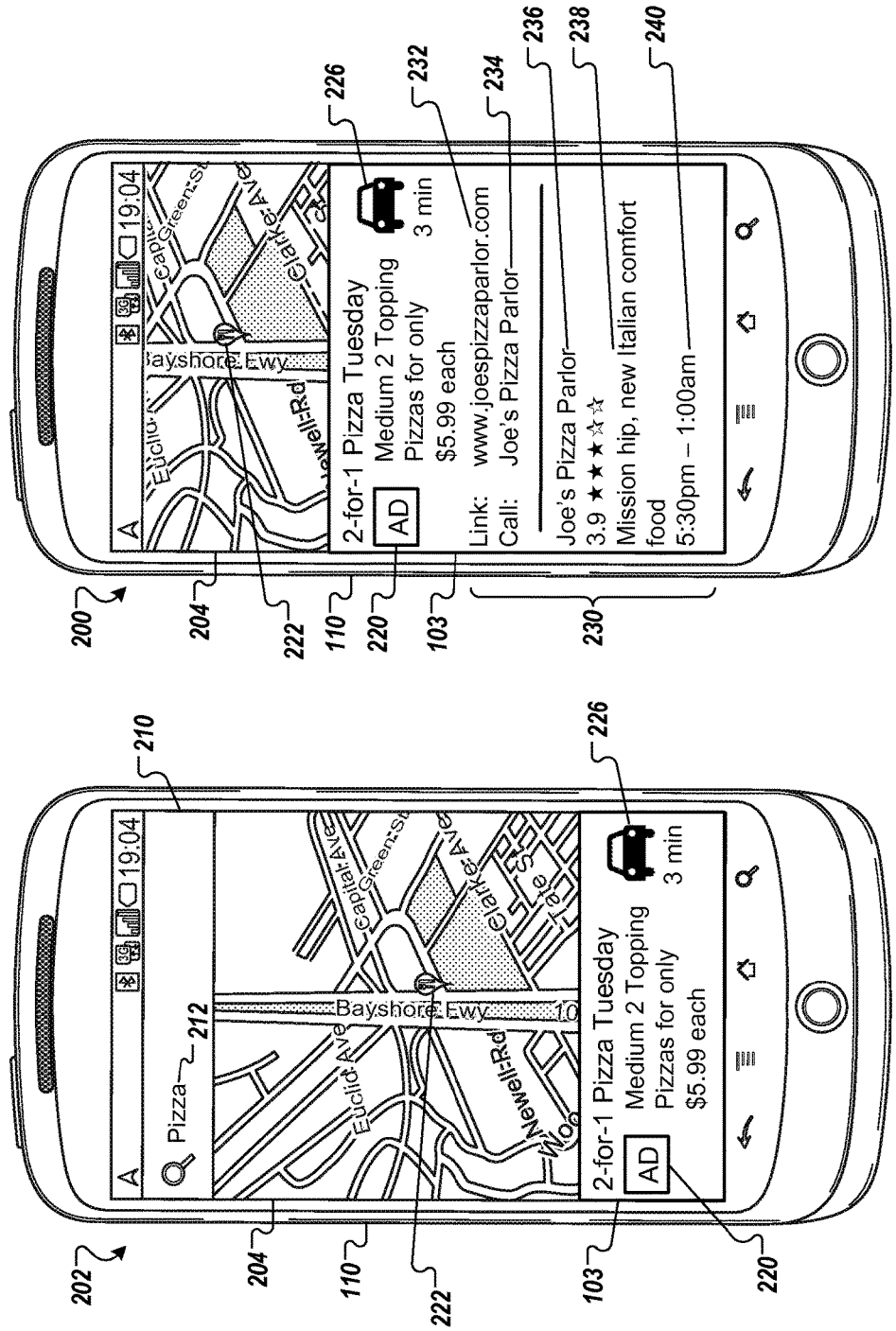

DETECTING QUERIES FOR SPECIFIC PLACES

TECHNICAL FIELD

This document relates to information presentation.

BACKGROUND

The rise of the Internet has facilitated easy access to information for millions of people. Some website publishers freely publish their content to increase the number of visitors to their respective websites. For example, some news organizations freely provide news coverage to visitors of their respective websites; and some entertainment related websites freely provide entertainment articles and stories to visitors of their respective websites; etc.

To generate revenue, these publishers sell space (e.g. to be populated with sponsored content (e.g., advertising)) on their websites to derive income. For example, in a sponsored content syndication model, advertisers can extend their marketing reach by distributing sponsored content to publishers. The publishers can place advertisers' text, video or image advertisements on web pages that have content related to the sponsored content. As the users are likely interested in the particular content on the publisher webpage, they may also be interested in the product or service featured in the sponsored content. Accordingly, such targeted sponsored content placement can help drive online customers to the advertiser's website, which, in turn, can generate revenue for the publishers.

One service that publishers can include in a website is online map service. Some of these conventional services provide maps that are very sophisticated and allow users to view traditional street maps, street maps including representations of the actual buildings, and even satellite images.

SUMMARY

Systems, apparatus, computer program products and methods for responding to user queries in a map space are disclosed.

In a first aspect, a method includes identifying a search query that was submitted through a map interface, determining that a number of specific query indicators that are included in the search query meets a pre-specified number of specific query indicators, wherein the specific query indicators are selected, at least in part, from a set consisting of commas and capital letters, classifying, in response to the determination, the search query as a specific place query, and providing, based on the determination, content that excludes sponsored content in response to the search query.

Various implementations can include some, all, or none of the following features. The method can also include determining that a number of specific query indicators that are included in a second search query does not meet the pre-specified number of specific query indicators, classifying, in response to the determination, the second search query as a general query, and providing, based on the determination, content that includes sponsored content in response to the second search query. The pre-specified number of specific query indicators can include two or more commas. Specific query indicators can be selected from a set including proper place names. Specific query indicators can be selected from a set including odonyms. The method can also include identifying a language of the search query, and wherein the specific query indicators are selected from the set further consisting of address character forms and address separators used in the identified language. The language can be identified based on one or more of a configuration setting of the map interface, a location where the search query was submitted, and a location provided by the map interface when the search query was submitted. The pre-specified number of specific query indicators can include two or more address separators used in the identified language. The set can also include query characters.

In a second aspect, a system includes a map store that stores map data defining a map, a map server in communication with the map store, and a content server in communication with the map server. The map server is configured to perform operations including receiving a search query, determining that a number of specific query indicators that are included in the search query meets a pre-specified number of specific query indicators, wherein the specific query indicators are selected from a set consisting of commas and capital letters; and classifying, in response to the determination, the search query as a specific place query. The content server is configured to provide, based on the determination, content that excludes sponsored content in response to the search query.

Various implementations can include some, all, or none of the following features. The map server can be further configured to perform operations that include determining that a number of specific query indicators that are included in the search query does not meet the pre-specified number of specific query indicators, and classifying, in response to the determination, the search query as a general query, and the content server can be further configured to provide, based on the determination, content that includes sponsored content in response to the search query. The pre-specified number of specific query indicators can include two or more commas. Specific query indicators can be selected from a set further consisting of proper place names. Specific query indicators can be selected from a set further consisting of odonyms. The operations further comprise identifying a language of the search query, and wherein the specific query indicators are selected from the set further consisting of address character forms and address separators used in the identified language. The language can be identified based on one or more of a configuration setting of the map interface, a location where the search query was submitted, and a location provided by the map interface when the search query was submitted. The pre-specified number of specific query indicators can include two or more address separators used in the identified language. The set can also include query characters.

The systems and techniques described here may provide one or more of the following advantages. First, a system can provide general requested place information along with promotional content that a requesting user may find useful when the user appears to be performing a general location search, and provide specific location information without additional content with when the user appears to be searching for a specific location. Second, the system can use localized conventions used for textual representations of locations or addresses to differentiate between general place searches and specific place searches. Third, the system is lightweight enough to make such determinations at a client device. Fourth, the system requires no change in user behavior in order to determine whether a query is a general place query or a specific place query, and respond differently to the determined query type.

The details of one or more implementations are set forth in the accompanying drawings and the description below.

Other features and advantages will be apparent from the description and drawings, and from the claims.

DESCRIPTION OF DRAWINGS

FIGS. 2A-2C are examples of a map space.

DETAILED DESCRIPTION

This document describes systems and techniques for responding to user queries in a map environment. In general, a user of a map advertising environment (e.g., a map application ("app") running on a mobile device) can submit search queries in order to find the locations of various places. In some examples, a user may wish to find a type of place rather than a specific place, such as "auto repair near Maple Grove" rather than "Nate's Auto Repair, Maple Grove, Minn.". In such examples, the map advertising environment may respond by presenting a list of results and/or sponsored content (e.g., a discount for auto repair at a particular garage). In other examples the user may be searching for a specific place, and may find other results and/or advertisements to be distracting from the task at hand.

Figure 1:
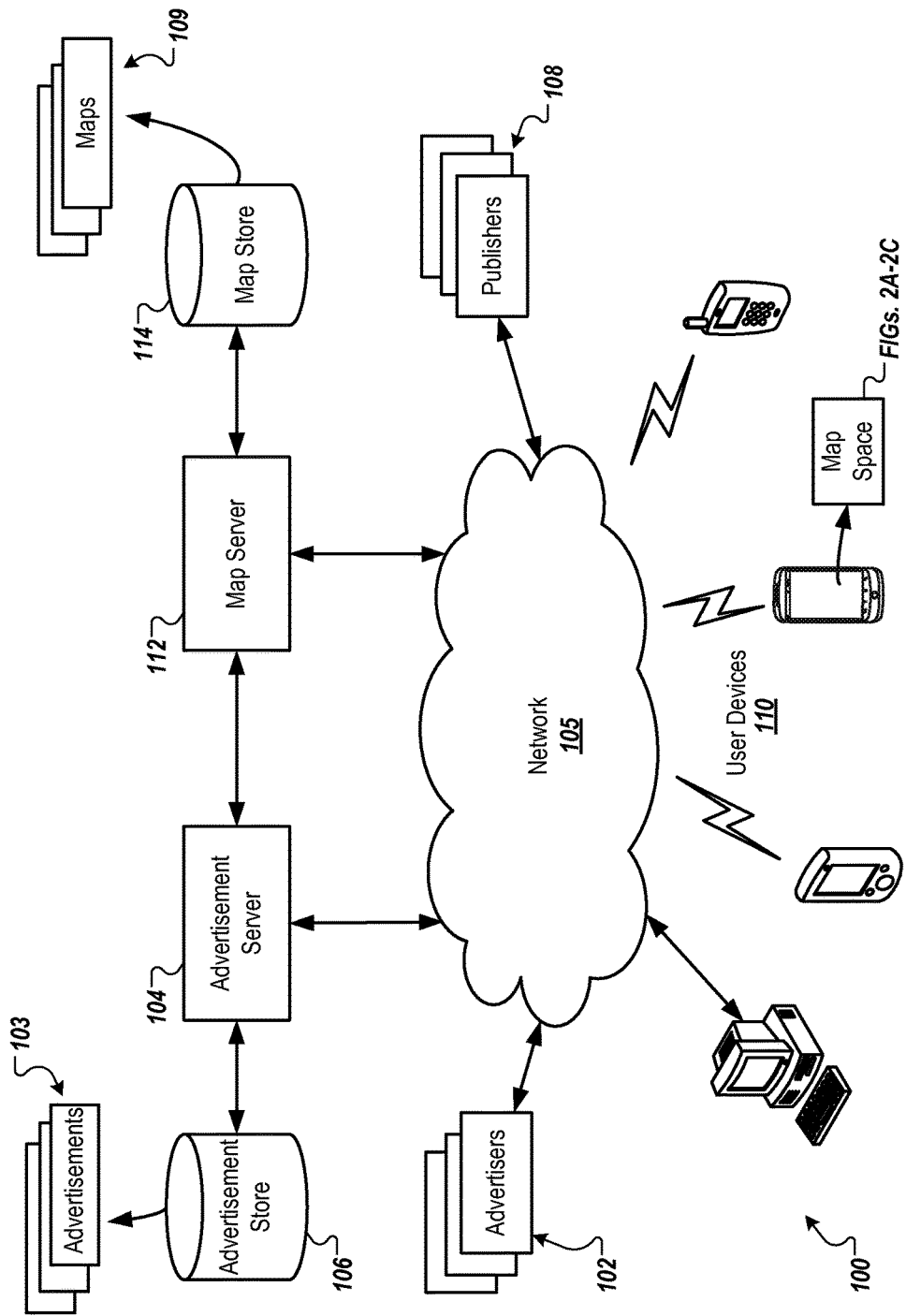
FIG. 1 is a block diagram of an example map environment.

FIG. 1 is a block diagram of an implementation of an example map environment 100. In some implementations, advertisers 102 can connect to a sponsored content server 104 to upload sponsored content 103, track advertising statistics, bid for advertising space, or otherwise interact with the sponsored content server 104. The advertisers 102 can connect to the sponsored content server 104 through the network 105. The network 105 can be a wide area network, local area network, the Internet, or any other public or private network, or combination of both. While reference is made to the sponsored content server 104, other content servers can be implemented in the environment 100.

The sponsored content 103 (e.g. content items) may be in the form of graphical advertisements (e.g., banner advertisements), text only advertisements, image advertisements, audio advertisements, video advertisements, advertisements combining one of more of any of such components, etc. The sponsored content may also include embedded information, such as links, meta-information, and/or machine executable instructions. The sponsored content 103 can be formatted for presentation in maps 109. The sponsored content 103 can be stored in a sponsored content store 106 that is connected to the sponsored content server 104. While reference is made to sponsored content, environment 100 can deliver other forms of content items including other forms of sponsored content.

Publishers 108 can be network content providers that publish websites. The publishers 108 receive requests for content from the user devices 110 and present content in response to the requests. In response to requests, the publishers 108 can include maps 109 with the content, thereby allowing the user devices 110 access to maps 109 through the publisher's website. User devices 110 can connect to the publishers' websites through the network 105 utilizing any device capable of communicating in a computer network environment, and displaying retrieved information, for example, a web-enabled handheld device, a mobile telephone, a set top box, a game console, a personal digital assistant, a navigation device or a computer.

In some implementations, the publishers 108 can include a map 109 with the requested content by requesting the map 109 from the map server 112. In response to the map request by the publisher 108, the map server 112 selects data for the requested map 109 from the map store 114 for presentation.

The request for a map 109 can also include or generate a request for sponsored content 103. In these implementations, the map server 112 can request sponsored content 103 from the sponsored content server 104. The sponsored content 103 selected for delivery to the map server 112 can be selected based on their association with the map 109 selected by the map server 112. For example, the sponsored content 103 can be associated with the map 109 if the advertiser 102 has a retail location within the map 109 selected.

In some implementations, the request for a map 109 includes a request for sponsored content 103, and the sponsored content 103 are delivered to the map server 112 by the sponsored content server 104. The map server 112 integrates the sponsored content 103 into the map 109 by placing the sponsored content 103 on the map 109. The sponsored content 103 can be placed on the map 109 at a location representative of the location associated with the advertiser 102 (e.g., a map of the retail location of the advertiser). The sponsored content 103 can be placed on the map 109 by embedding the sponsored content 103 in the map 109, e.g., rendering the sponsored content 103 as part of the map 109. In this implementation, the sponsored content 103 are subject to any changes affecting the display of the map 109. For example, if the map 109 is displayed at a higher zoom level, the sponsored content 103 that are rendered as part of the map 109 will also be displayed at the higher zoom level.

Alternatively, the sponsored content 103 can be placed on the map by presenting the sponsored content 103 as overlays on the map 109. When the sponsored content is presented as overlays on the map 109, they are maintained in a separate file and do not become part of the map 109. Therefore, the characteristics of the sponsored content 103 is independent of the characteristics of the map 109 and a change affecting the display of the map 109 will not necessarily affect the display of the sponsored content 103. For example, if the map 109 is displayed at a higher zoom level, the sponsored content 103 will not necessarily be displayed at the higher zoom level.

An example publisher 108 that may present a map 109 with other content is a general content website publisher that receives requests for information associated with a geographic location. The example publisher 108 can provide, for example, movie listing information and a list of theatres that are showing the movies in a geographic location. Additionally, the publisher 108 can include a map 109 on the web page that shows the location of the theatres relative to a specified location. The publisher 108 can request the map 109 from the map server 112. The map server 112 responds by providing the requested map 109.

In some embodiments, the map 109 can be provided as a web page. For example, the user devices 110 can host a web browser that can be used to request, from the map server 112 or a general purpose web server in communication with the map server 112, a web page that includes the map 109. In some embodiments, the map 109 can be provided by a mapping software application ("app") running on the user devices 110. For example, the user device 110 can be a smartphone that can download and execute a map app, and a user can interact with the map app to cause the map app to request map information from the map server 112. The map app can use the requested map information to generate and present the map 109 to the user.

The publisher 108 and/or map server 112 can also request that sponsored content 103 be included in the map 109. If the map request includes a request for sponsored content 103, the map server 112 requests sponsored content 103 associated with the map 109 for presentation in the map 109. The map 109 presented to the user device 110 will include the requested map and sponsored content 103 associated with the map 109, as illustrated in FIGS. 2A and 2B.

Figure 2C:
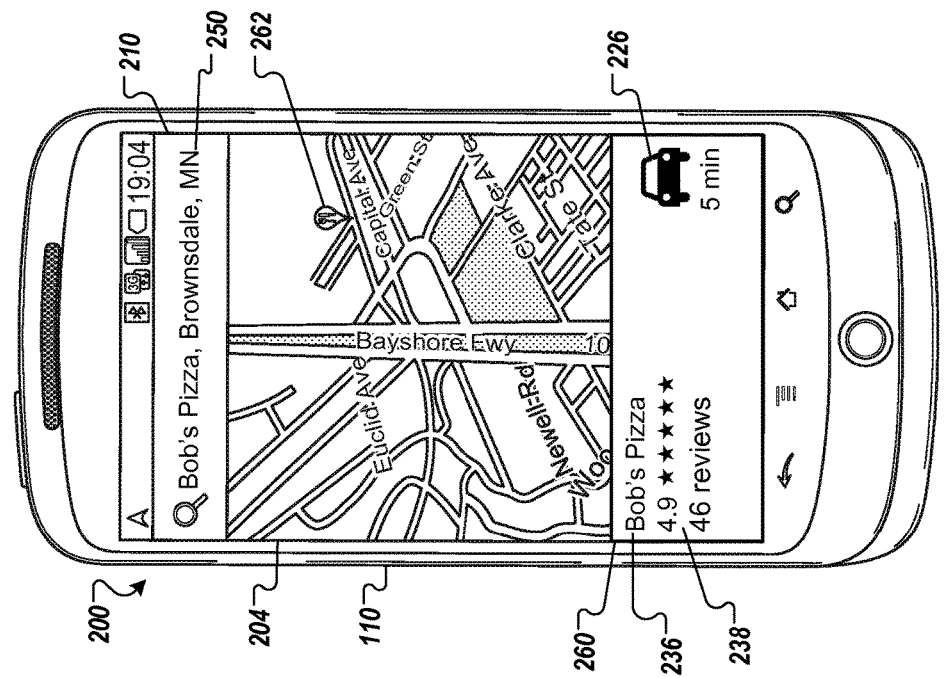

FIGS. 2A-2C are examples of a map space 202 that displays sponsored content 103. The map space 202 is the portion of the map 109 selected by the map server 112 that can be displayed on a user device 110. In some implementations, the map space 202 is defined by a display region 204 and a zoom level. The display region 204 is the portion of the user's display that is allocated to present the map space 202. In some implementations, the map space 202 can be further defined by a central point. The central point can be the location of interest (e.g., city center, destination, store location) or any other point within the map space that serves as a reference point.

The display region 204 can vary according to a number of factors including display device limitations, user preferences, and publisher preferences, etc. In the example shown, the display region 206 is defined by the size and resolution of the display device. For example, a tablet computer with a 7 inch display and 1920×1200 resolution can display more of a map 109 than a handheld device having a 4 inch display and 1280×768 resolution. Accordingly, the map space 202 that is selected for presentation to different user devices 110 will likely be different when the display region 204 and resolution of each user device 110 is different.

User devices 110 can interact with the map server 112 over the network 105 by using map websites and other map programs, such as a mapping "app". Utilizing these services the user devices 110 can request maps 109 from the map server 112 through various query or browsing methods. For example, user devices 110 can search a particular address or business by directly entering the name of the business or address into a search interface 210. In this scenario, the map space 202 presented in response to the search can identify the location 222 of the address or business searched, as well as present one or more items of sponsored content 103 within the map space 202.

The user interacts with the user devices 110 to request the maps 109 by submitting a user query. The user device 110 and/or the map server 112 classify the user query as one of either a general place query or a specific place query. In some implementations, the system can classify the user query as a specific place query when the user query includes at least a predetermined number of criteria (e.g., two or more commas, two or more nonconsecutive capital letters), and the system can classify the user query as a general place query when the user query does not include at least the predetermined number of criteria.

Referring now to FIG. 2A, the user uses the search interface 210 to enter a general place query. General place queries are user queries for location information, but are not drawn to a specific business or entity (e.g., "pet store" can be a general query, whereas "Sara's Super Pet Store" can name a specific business). Other examples of general place queries can include "auto repair", "Thai restaurants", "dentists near Houston", or "daycare centers". General place queries include less than a predetermined number of proper place names, address separators, capital letters, known place names, odonyms, or other indicators of a specific place query. Specific place queries are discussed further in the descriptions of FIGS. 2C and 3.

In the illustrated example, the user has entered a general place query 212 for "pizza". In some embodiments, the search interface 210 can be a text user interface, a speech recognition interface, a selectable list, or any other appropriate form of user interface that can be used to provide a search query.

The user device 110 and/or the map server 112 can process the user query to determine that it is a general place query. For example, the query "pizza" includes no commas or other address separators and includes no capital letters that can indicate a proper name. The user device 110 can interact with the map server 112 and the advertising server 104 to process the general place query 212. The advertising server 104 and/or the map server 112 provide a collection of content 220 that is responsive to the general place query back to the user device 110 for presentation in the map space 202 as the sponsored content 103.

In response to the general place query 212, the collection of content 220 is presented in the map display 204 along with a marker 222 to indicate the map location associated with the sponsored content 103 and a navigation control 226 with which the user can interact (e.g., touch, click) to request directions to the location associated with the sponsored content 103. In the illustrated example, the user has searched for the general term "pizza" and in response the device 112 displays sponsored content promoting a special 2-for-1 deal on pizza near the search area and the location of the business that is being promoted by the sponsored content 103.

Referring now to FIG. 2B, the user can interact with the sponsored content 103 (e.g., touch, click), and in response the user device 112 hides the search interface 210 and expands the sponsored content 103 to display a collection of additional content 230. The collection of additional content 230 includes a link 232 to the promoted business, a telephone control 234 that may be selected to initiate a call to the promoted business, a business name 236, a review summary 238, and a list of operating hours 240, and/or other information about the business being promoted by the sponsored content 103.

Referring now to FIG. 2C, the user uses the search interface 210 to enter a specific query, such as "Gallery Apartments, 815 39th Street North, Grand Forks, N. Dak.", or "Auto Hut, 123 Main Street, Rochester". A specific query is a query that is submitted in a format that suggests a specific location or a proper place name. In some implementations, a specific query can be indicated by the use of a predetermined number of specific query indicators in the query, such as capital letters (e.g., proper nouns), punctuation (e.g., commas between parts of an address), query length (e.g., a count of all characters in the query, suggestive of specificity or copying-and-pasting from another source), use of address elements (e.g., "street", "avenue", "north"), geographic names (e.g., "Minneapolis", "Moscow", "MN", "Florida"), and combinations of these and other indicators that can suggest a that the query is for a specific place. In the illustrated example, the user has entered a specific place query 250 for "Bob's Pizza, Brownsdale, Minn.".

The user device 110 can interact with the map server 112 and the advertising server 104 to process the specific place query 250 and identify it as a specific search query. The advertising server 104 and/or the map server 112 provide a collection of location content 260 (e.g., location specific content) that is responsive to the specific place query 250 back to the user device 110 for presentation in the map space 202.

In response to the specific place query 250, the collection of location content 260 is presented in the map display 204 along with a marker 262 to indicate the map location associated with the collection of location content 260 and a navigation control 226 with which the user can interact (e.g., touch, click) to request directions to the location associated with the collection of location content 260. In the illustrated example, the user has searched for the specific term "Bob's Pizza, Brownsdale, Minn.," and in response the device 112 displays the location of, and information about, "Bob's Pizza". When the user submits a specific query, the collection of location content 260 does not include sponsored content 103 for locations other than the business or entity that is located at the identified specific location.

The user device 110 and/or the map server 112 processes user queries to determine whether the user query is a specific place query or a general place query. In some implementations, the determination can be based at least partly on the quantity of address separators (e.g., commas, periods, spaces) present in the user query. For example, in the English language, commas are commonly used to separate elements of an address (e.g., "Acme Appliances, Anytown, Tex."). The number of separators in the user query can be counted and compared to a predetermined number (e.g., two or more commas) to determine that a user query is a specific query. In some implementations, the determination can be based at least partly on the use of capitalization in the user query. For example, the user of proper capitalization may suggest that the user query includes proper place names, and therefore may be a specific place query. In some implementations, the determination may be at least partly based on the use of known proper nouns or place names. For example, the user query may be for "Wrigley Field" or "White House", and the map server 112 may recognize these names as representing specific places. In some implementations, the determination may be at least partly based on the length of the user query. For example, relatively short user queries (e.g., less than 5 or 10 characters) may suggest a general place query, while relatively long user queries may suggest specificity, e.g., the user purposely entered a very specific query or may have cut-and-pasted an address as the user query from another source. In some implementations, the determination may be based at least partly on the presence of odonyms in the user query. For example, the user query may include words such as "street", "avenue", "drive", "highway", "boulevard", "lane", "place", or "plaza", which may suggest that the user query is a specific place query. In some implementations, the determination may be based at least partly on the presence of known geographic names in the user query. For example, words such as "Des Moines", "Boston", "CA", "MN", "USA", and "Argentina" may be recognized as known specific place names, which may suggest that the user query is a specific place query.

In some implementations, the determination of whether the user query is a specific query or a general query can be based at least partly on the language or locale of the user query. For example, the user device 110 may be configured for a language that uses periods, slashes, or other characters (e.g., non-Western characters) to separate parts of addresses, and a predetermined number of separator characters typically used for the identified language may be used to at least partly determine whether the user query is a specific place query. In another example, capitalization or other grammatical patterns used in the identified language may be at least partly used determine whether the user query is a specific place query. In some implementations, place names and/or odonyms used in the identified locale or language of the user query may be used to at least partly determine whether the user query is a specific place query. For example, the user query may be identified as being submitted in Spanish, and as such terms such as "Cuidad de Mexico" or "Madrid" may be identified as known specific places. In another example, the user query may be identified as being submitted from or in the context of a primarily French-speaking geographic region where terms such as "chemin", "rue", and "maniere" may be used as part of a specific place query.

Figure 3:
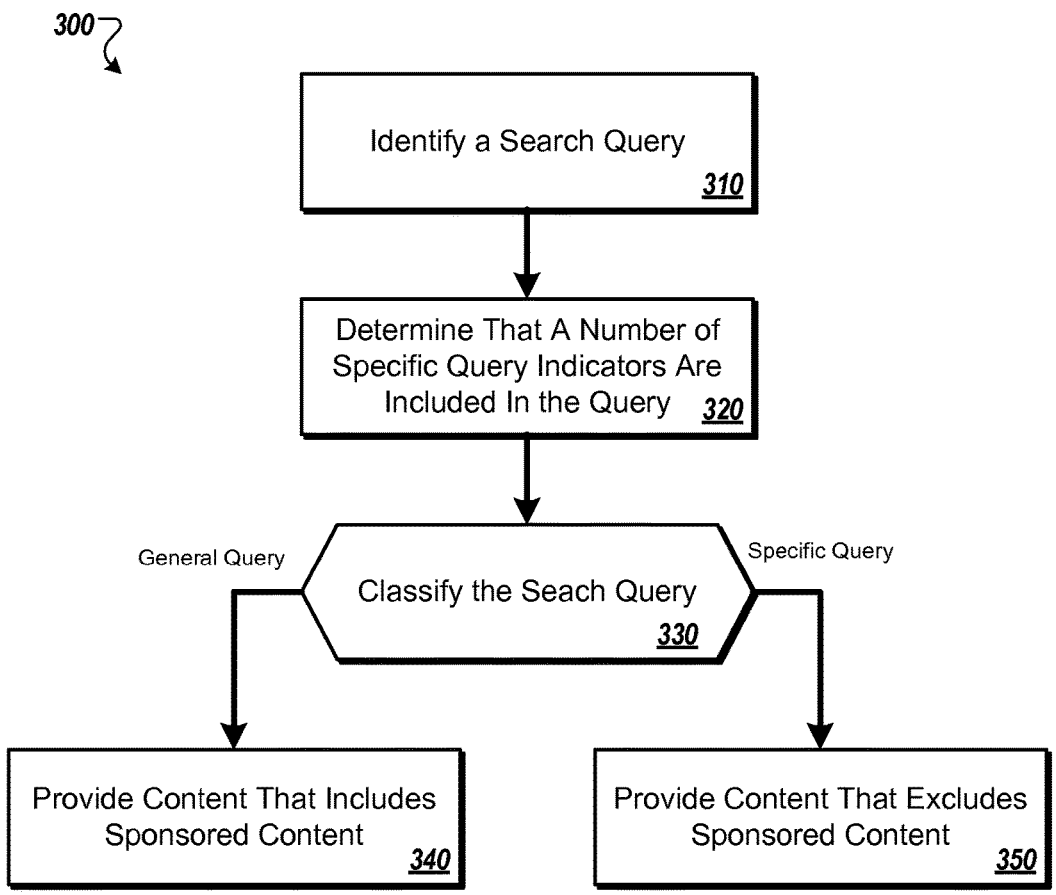
FIG. 3 is flow chart that shows an example of a process for detecting queries for specific places.

FIG. 3 is flow chart that shows an example of a process 300 for detecting queries for specific places. In some implementations, the process 300 may be performed in whole or part by one or more components of the system 100 of FIG. 1.

The process 300 begins at 310 when a search query that was submitted through a map interface is identified. For example, a user can submit a search query through the query interface 210 of FIGS. 2A and 2C. In other examples, the search query can be identified 310 by the user device 110 or the map server 112 when the user highlights a character string or speaks a phrase as a user query.

At 320, a number of specific query indicators that are included in the search query is determined to meet a pre-specified number of specific query indicators, wherein the specific query indicators are selected from a set consisting of commas and capital letters. For example, the specific place query 250 (e.g., "Bob's Pizza, Brownsdale, Minn.") includes five capital letters and two commas. The number of capital letters can be compared to a predetermined minimum number of capital letters to determine that the user query is a specific place query, and/or the number of commas can be compared to a predetermined minimum number of commas to determine that the user query is a specific place query. In some implementations, the quantity and/or usage of capitalization, punctuation, proper place names, odonyms, address separators, or combinations of these and other indicators of specific place queries may be used. In some implementations, the aforementioned indicators may be identified at least in part based on an identification of the language in which the user query was submitted and/or a geographic context in which the user query was submitted. For example, predetermined combinations of Chinese address conventions may be used as the aforementioned types of indicators may be used in the determining when the user query is determined to have been submitted in the Chinese language, in the context of a geographic area in which Chinese is known to be in use, and/or submitted from a geographic area in which Chinese is known to be in use (e.g., GPS metadata optionally provided with the user query identifies that the user device 110 was in a Chinese-speaking region when the user query was submitted). In some implementations, the quantity of characters submitted in the user query may be compared to a predetermined minimum number of characters to determine that the user query of a specific place query. For example, user queries having more than ten, fifteen, or twenty characters may suggest that the user had manually entered a detailed query, or had copy-and-pasted the query from another source, and may therefore be a specific place query.

If the search query does not meet a pre-specified number of specific query indicators, then at 330 the search query is classified as a general place query, and at 340 content that includes sponsored content is presented in response to the search query. For example, the general place query 212 can be determined and classified as a general place query, and in response the user device 110 can present the sponsored content 103.

If the search query does meet a pre-specified number of specific query indicators, then at 330 the search query is classified as a specific place query, and at 340 content that excludes sponsored content is presented in response to the search query. For example, the specific place query 250 can be determined and classified as a specific place query, and in response the user device 110 can present the collection of location information 260, which does not include sponsored content.

Figure 4:
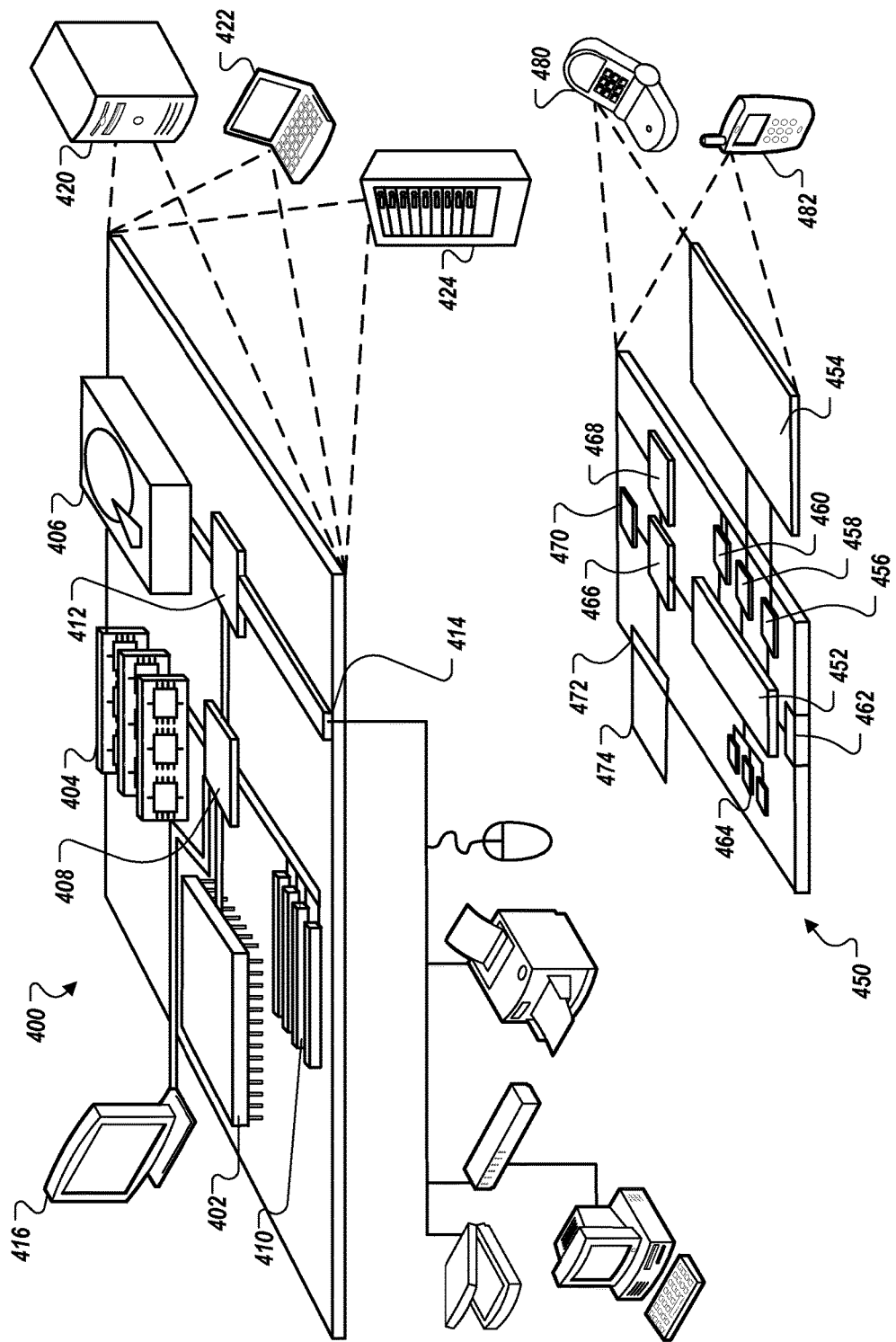
FIG. 4 is a block diagram of computing devices that may be used to implement the systems and methods of FIGS. 1-3.

FIG. 4 is a block diagram of computing devices 400, 450 that may be used to implement the systems and methods described in this document, either as a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, Voice Over LTE (VOLTE) calls, SMS, EMS, or MMS messaging, CDMA, TDMA, PDC, WCDMA, CDMA2000, GPRS, WiMAX, LTE, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communication audibly using audio codec 460, which may receive spoken information from a user and convert it to usable digital information. Audio codex 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving, by a computing system, and as having been provided by a computing device, a search query that was submitted through a map interface of the computing device;
   counting, by the computing system, capital letters in the search query to identify a count of capital letters that are included in the search query;

determining, by the computing system, that the count of capital letters that are included in the search query meets a pre-specified number of capital letters;

counting, by the computing system, commas in the search query to identify a count of commas that are included in the search query;

determining, by the computing system, that the count of commas that are included in the search query meets a pre-specified number of commas;

classifying, by the computing system and in response to the determination that the count of capital letters that are included in the search query meets the pre-specified number of capital letters and the determination that the count of commas that are included in the search query meets the pre-specified number of commas, the search query as a query that identifies a specific place;

providing, by the computing system and for receipt by the computing device, based on the classification of the search query as one that identifies a specific place, a response to the search query that excludes sponsored content;

receiving, by the computing system, and as having been provided by the computing device, a second search query that was submitted through the map interface of the computing device;

determining, by the computing system, that a count of capital letters that are included in the second search query does not meet the pre-specified number of capital letters;

determining, by the computing system, that a count of commas that are included in the second search query does not meet the pre-specified number of commas;

classifying, by the computing system and in response to the determination that the count of capital letters that are included in the second search query does not meet the pre-specified number of capital letters and the determination that the count of commas that are included in the second search query does not meet the pre-specified number of commas, the second search query as a query that identifies a general type of place; and providing, by the computing system and for receipt by the computing device, based on the classification of the second search query as one that identifies a general type of place, a response to the second search query that includes sponsored content.

2. The method of claim 1, wherein the pre-specified number of commas comprises two or more commas.

3. The method of claim 1, further comprising:
counting, by the computing system, proper place names in the search query to identify a count of proper place names that are included in the search query; and
determining, by the computing system, that the count of proper place names that are included in the search query meets a pre-specified number of proper place names, wherein classifying the search query as a query that identifies a specific place is performed at least in part in response to the determination that the count of proper place names that are included in the search query meets the pre-specified number of proper place names.

4. The method of claim 1, further comprising:
counting, by the computing system, odonyms in the search query to identify a count of odonyms that are included in the search query; and
determining, by the computing system, that the count of odonyms that are included in the search query meets a pre-specified number of odonyms, wherein classifying the search query as a query that identifies a specific place is performed at least in part in response to the determination that the count of odonyms that are included in the search query meets the pre-specified number of odonyms.

5. The method of claim 1, further comprising:
identifying, by the computing system, a language of the search query;
counting, by the computing system, a count of address separators used in the identified language that are included in the search query; and
determining, by the computing system, that the count of address separators used in the identified language that are included in the search query meets a pre-specified number of address separators, wherein classifying the search query as a query that identifies a specific place is performed at least in part in response to the determination that the count of address separators used in the identified language that are included in the search query meets the pre-specified number of address separators.

6. The method of claim 5, wherein the language is identified based on one or more of a configuration setting of the map interface, a location where the search query was submitted, and a location provided by the map interface when the search query was submitted.

7. The method of claim 5, wherein the pre-specified number of address separators comprises two or more address separators used in the identified language.

8. A system comprising:
a map server in communication with a map store that stores in memory map data defining one or more maps, the map server including one or more computer processors configured to perform operations comprising:
receiving a search query that was submitted through a map interface of a computing device,
counting capital letters in the search query to identify a count of capital letters that are included in the search query,
determining that the count of capital letters that are included in the search query meets a pre-specified number of capital letters,
counting commas in the search query to identify a count of commas that are included in the search query,
determining that the count of commas that are included in the search query meets a pre-specified number of commas,
classifying, in response to the determination that the count of capital letters that are included in the search query meets the pre-specified number of capital letters and the determination that the count of commas that are included in the search query meets the pre-specified number of commas, the search query as a query that identifies a specific place,
receiving a second search query that was submitted through the map interface of the computing device,
determining that a count of capital letters that are included in the second search query does not meet the pre-specified number of capital letters,
determining that a count of commas that are included in the second search query does not meet the pre-specified number of commas, and
classifying, in response to the determination that the count of capital letters that are included in the second search query does not meet the pre-specified number of capital letters and the determination that the count of commas that are included in the second search query does not meet the pre-specified number of commas, the second search query as a query that identifies a general type of place; and a content server in communication with the map server, the content server including one or more computer processors configured to:

provide for receipt by the computing device, based on the classification of the search query as one that identifies a specific place, a response to the search query that excludes sponsored content, and provide for receipt by the computing device, based on the classification of the second search query as one that identifies a general type of place, a response to the second search query that includes sponsored content.

9. The system of claim 8, wherein the pre-specified number of commas comprises two or more commas.

10. The system of claim 8, wherein the map server is configured to perform operations further comprising:

counting proper place names in the search query to identify a count of proper place names that are included in the search query; and determining that the count of proper place names that are included in the search query meets a pre-specified number of proper place names, wherein classifying the search query as a query that identifies a specific place is performed at least in part in response to the determination that the count of proper place names that are included in the search query meets the pre-specified number of proper place names.

11. The system of claim 8, wherein the map server is configured to perform operations further comprising:

counting odonyms in the search query to identify a count of odonyms that are included in the search query; and determining, by the computing system, that the count of odonyms that are included in the search query meets a pre-specified number of odonyms, wherein classifying the search query as a query that identifies a specific place is performed at least in part in response to the determination that the count of odonyms that are included in the search query meets the pre-specified number of odonyms.

12. The system of claim 8, wherein the map server is configured to perform operations further comprising:

identifying a language of the search query;

counting a count of address separators used in the identified language that are included in the search query; and determining that the count of address separators used in the identified language that are included in the search query meets a pre-specified number of address separators, wherein classifying the search query as a query that identifies a specific place is performed at least in part in response to the determination that the count of address separators used in the identified language that are included in the search query meets the pre-specified number of address separators.

13. The system of claim 12, wherein the language is identified based on one or more of a configuration setting of the map interface, a location where the search query was submitted, and a location provided by the map interface when the search query was submitted.

14. The system of claim 12, wherein the pre-specified number of address separators comprises two or more address separators used in the identified language.

\* \* \* \* \*